Feb. 19, 1946.  C. S. KING  2,395,126
WATER TREATMENT AND COMPOSITION
Filed Jan. 25, 1944
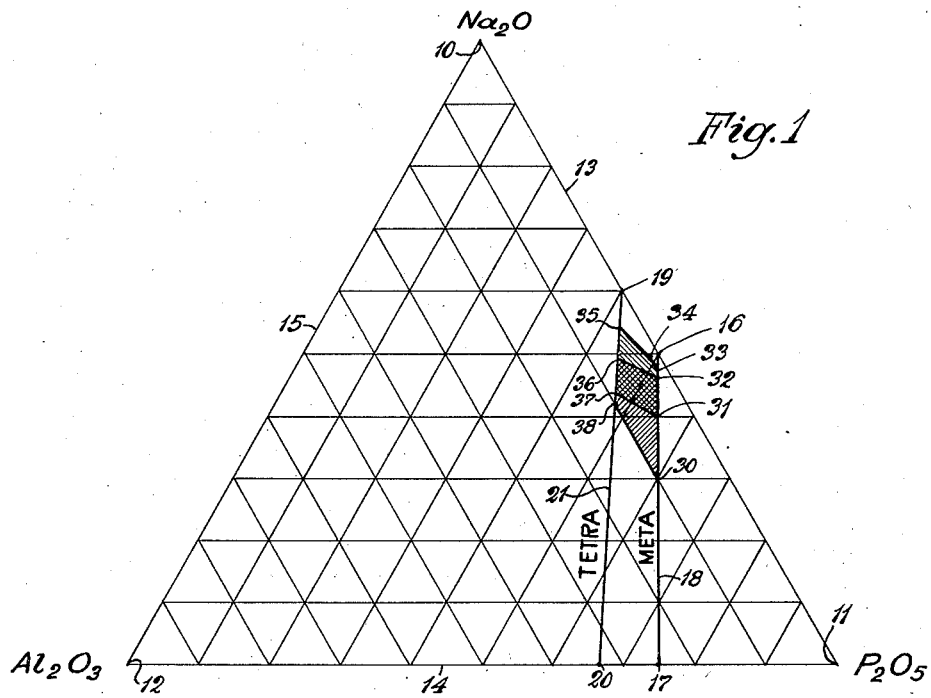
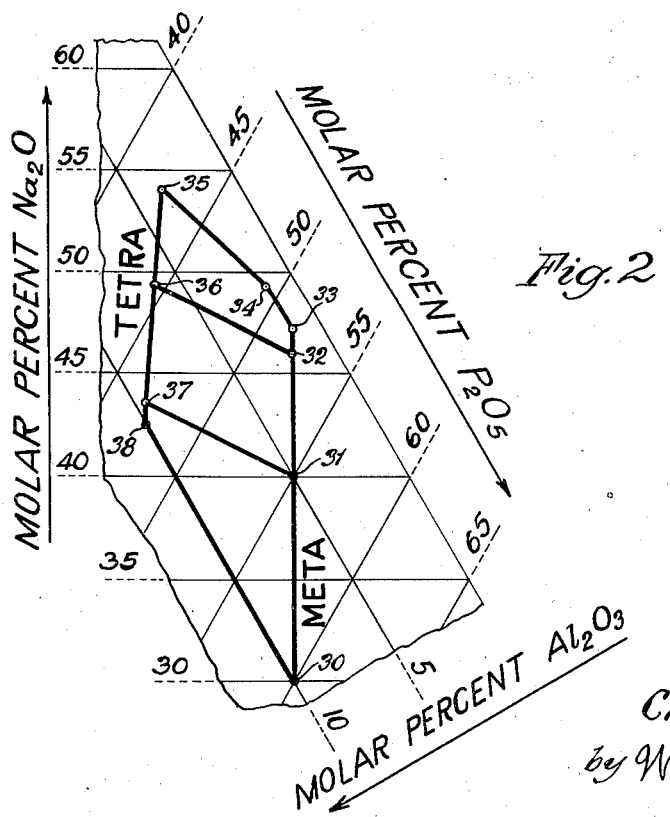
Inventor
Charles S. King
by W. Bartlett Jones,
Attorney.

Patented Feb. 19, 1946

2,395,126

UNITED STATES PATENT OFFICE 2,395,126

WATER TREATMENT AND COMPOSITION

Charles S. King, Joliet, Ill., assignor to Blockson Chemical Co., Joliet, Ill., a corporation of Illinois Application January 25, 1944, Serial No. 519,633

8 Claims. (Cl. 210—23)

The present invention relates generally to treating water, and to a complex water-treating phosphate salt therefor. It relates particularly to a porous bed of such material and to flowing water through the bed to dissolve material therefrom.

The use of alkali-metal salts of acid of phosphorus, such as metaphosphates, pyrophosphates, and other polyphosphates, is well-known for treating hard water. Such salts are quite soluble and are unsuitable for practical use in a bed through which water may be passed for desirable periods of time without refilling. Not only do they dissolve readily, but being hygroscopic, they gel and congeal into a cake in a bed when water becomes stagnant therein, or is even in motion through the bed, thus clogging the bed.

It is an object of the present invention to provide complex salts of acid of phosphorus, characterized by desirable water-treating properties, by suitable solubility characteristics for water treatment, and by suitably slow or limited solubility for maintenance of a porous bed thereof for a considerable length of time both with water flowing through the bed and static in the bed.

It is an object of the present invention to provide an aluminum-containing complex water-treating salt of the kind referred to.

It is also an object to provide a suitable chemical salt bed and to pass water therethrough at a substantially constant rate to charge the water to a predetermined extent with material dissolved from the bed, either to treat the water so passing through the bed, or to add such so-charged water to water to be treated.

It is a particular object of the invention to provide a bed of material through which water may be continuously passed while dissolving not more than about 1% by weight of the bed per hour, at temperatures not over about 25° C., regardless of the amount of water passing therethrough.

Various other and ancillary objects and advantages of the invention will appear from the following description and explanation of the invention, given in connection with the accompanying drawing in which:

Fig. 1 shows a trilinear diagram of 3-component compositions, and

Fig. 2 is a fragmentary enlargement of Fig. 1.

Reference is made to my copending applications, Serial No. 360,065, filed October 7, 1940, now U. S. Patent No. 2,370,473 of February 27, 1945, and a continuation-in-part thereof Serial No. 402,725, filed July 17, 1941, now U. S. Patent No. 2,370,473 of February 27, 1945, of which two applications the present application is a continuation-in-part. As stated in said applications, complex vitreous glass compositions, analytically consisting of aluminum oxide ($Al_2O_3$), sodium oxide ($Na_2O$), and phosphorus pentoxide ($P_2O_5$), may be made by fusing any suitable chemicals providing ash content of $Na_2O$, $Al_2O_3$ and $P_2O_5$ and then chilling the melt.

I have determined that the presence of $Al_2O_3$ in substitution for $Na_2O$ in any glass represented by the formula:

(1) $$xNa_2O.yP_2O_5$$

is less water-soluble because of the presence of the $Al_2O_3$.

There is also another property of these salts. A glass within the compositions such as (1), is hygroscopic with water. Particles of it wet with water will swell, and if in contact for short periods of time, will cement together or "congeal." This property is gradually lost with loss of water-solubility, as effected by substituting some $Al_2O_3$ for some $Na_2O$. Use of such congealing particles, with or without said $Al_2O_3$, is not satisfactory for providing a bed through which to pass water to dissolve bed material. Certain glasses do not congeal if the water is moving continuously, but if the bed with water in it becomes static, congealing tends to close up the bed, impairing its utility or rendering it useless.

I have determined that for a commercially suitable bed material, the particles of it must be non-congealing, so that emergency conditions leading to a static bed with water in it, will not prevent renewed operation of the bed. The composition as well as particle size affect the congealing tendency of the bed. I have also determined that these two factors of size and composition also affect the rate of solution under controlled conditions; and I have determined that particles (whatever their size and their composition) are non-congealing, if they may be exposed at not over 25° C. with agitation to 5 times their weight of water for 24 hours with loss by dissolution of not more than about 25% of their weight, or in other words about 1% by weight per hour.

In order to exemplify this, I have determined that a composition of 3 molar per cent $Al_2O_3$ and 48.5 molar per cent each of $Na_2O$ and $P_2O_5$, in fine mesh is congealing and too quickly soluble, while in a coarse mesh is suitably slowly-soluble and non-congealing. At a size of 10 to 20 mesh (per inch) in said test 100% dissolves in 10 hours. But as lumps of about .5 x 1 inch in size, only 5.5% dissolves in 24 hours.

Wherein the expression of size in the form such as "$x$ to $y$ mesh (per inch)" is used herein, it means that a mass of the particles pass through a screen having $x$ meshes per inch and are retained by a screen having $y$ meshes per inch. But in larger sizes, commercial practice is not to use the "mesh" system, but to express size as of an averaged lump thereof, which averaged lump is not greater in any dimension than a large figure (such as 1 inch in the designation .5 x 1 inch lump size) and not smaller in any dimension than a small figure (such as .5 inch in said designation).

There are factors which limit the compositions, aside from the solubility. Thus, it is difficult to make glasses by fusing ingredients, and chilling, where the proportional content of $P_2O_5$ present is less than that corresponding to tetraphosphoric acid. Thus, a line of tetraphosphates on a trilinear diagram of $P_2O_5$, $Na_2O$ and $Al_2O_3$, is one boundary line for suitable glass compositions.

Another limiting time is a line for $P_2O_5$ content on said trilinear diagram corresponding to metaphosphate salts, because where a proportional content of $P_2O_5$ is present which is greater than that corresponding to metaphosphoric acid, the dissolved salt is less stable, and forms too acid a solution.

Increased content of sodium oxide leads to greater and faster solubility, which is lessened also as $Al_2O_3$ content increases. Increasing $Na_2O$ also increases undesirable hygroscopicity.

Said exemplary compositions having 3 molar per cent $Al_2O_3$ are within a special portion of the field of the present invention, of which field there are herein described three distinct portions. Since it was found that particle size may render a given composition suitable or unsuitable, it becomes necessary to define the useful materials of the present invention in terms of composition and of particle size. Consideration of the requirements of small and large beds, and consideration of the sizes produced in the commercial production of suitable glasses, have led to selecting a commercially practicable range of sizes from a lower limit of 10 to 20 mesh (per inch) to an upper limit of .5 x 1 inch lump size. This range accommodates both the producer, and the user of such glasses for beds. Selection of the range presents the problem of determining compositions to fit the range.

In the accompanying drawing there is shown a diagram of which vertices 10, 11 and 12 represent 100 molar per cent of $Na_2O$, $P_2O_5$ and $Al_2O_3$, respectively. Line 13 represents compositions consisting of $Na_2O$ and $P_2O_5$. Line 14 represents compositions consisting of $Al_2O_3$ and $P_2O_5$. Line 15 represents compositions consisting of $Al_2O_3$ and $Na_2O$. Any point inside the triangle represents a composition of $Na_2O$, $P_2O_5$, and $Al_2O_3$.

On line 13, the point 16 represents sodium metaphosphate represented by the formula $(NaPO_3)_2$ and consisting of equal molar portions of $Na_2O$ and $P_2O_5$. On line 14, the point 17 represents aluminum metaphosphate represented by the formula $Al(PO_3)_3$ and consisting of 1 mole of $Al_2O_3$ and 3 moles of $P_2O_5$. Hence, by connecting points 16 and 17 by line 18, line 18 represents compositions which may be considered salts of metaphosphoric with metal consisting of sodium and aluminum.

Likewise point 19 on line 13 represents sodium tetraphosphate having the empirical formula $Na_6P_4O_{13}$, and point 20 on line 14 represents aluminum tetraphosphate having the empirical formula $Al_2P_4O_{13}$. Hence, line 21 connecting points 19 and 20 represents compositions which may be considered salts of tetraphosphoric acid with metal consisting of sodium and aluminum.

As stated above, line 18 is a limit of glass compositions suitable for the present invention without being too acid, but it is not a limit of compositions having readily made vitreous glass forms. And, as stated above, line 21 is a limit for readily made vitreous glass compositions, but it is not a limit relating to acidity or alkalinity of solution of the glasses for the present invention. Between lines 18 and 21 lie the compositions of the present invention. The general direction of the zone 18—21 on the diagram indicates that downwardly, the contents of $Al_2O_3$ and of $P_2O_5$ increase, and content of $Na_2O$ decreases. Also, it has been determined experimentally that downwardly in this zone 18—21, solubility and hygroscopicity decrease.

Practical requirements call for compositions in the zone 18—21 which are not too insoluble and not too soluble. Experiments with many granular compositions have shown that certain high solubilities and congealing tendencies in a bed of the composition are accompanying characteristics where the solubility, in the described test therefor, exceeds about 1% by weight per hour at 25° C. in water 5 times the weight of the composition being tested, when tested for 24 hours, if possible. Therefore, granulated compositions which exceed this solubility are excluded from the present invention.

The lower limit of solubility is not related to congealing characteristics, and in practice bears only on relative volumes of bed material and water, rate of flow, and the concentration of dissolved glass desired. Practical considerations of commercial sizes of beds, rates of flow, and hardness of water commercially encountered, have led to considering as unsuitable those granular compositions which in said test for solubility are less soluble than 0.01% by weight per hour.

For many compositions variously located within the area of the triangular diagram, and inside or outside the zone 18—21, solubilities by said test have been determined, and from them certain ones have been selected for limiting the present invention when the sizes of the compositions are not finer on the average than 10 to 20 mesh (per inch) nor coarser on the average than .5 x 1 inch lump size. In the table below, under "Item No.," a numeral indicates the compositions on the diagram bearing such numeral on boundary line or intersections, and a letter indicates compositions anywhere on the diagram, either inside the shaded areas or outside thereof, or on a boundary line of the shaded areas.

The following table shows compositions so identified under "Item No." varying in the given molar per cents of $Al_2O_3$, $Na_2O$ and $P_2O_5$, and shows the solubility of each at 10 to 20 mesh (per inch) or at .5 x 1 inch lump size, in terms of per cent by weight dissolved per hour of time, when 20 grams of the composition is agitated with 100 grams of water at 25° C. for 24 hours. Where this given per cent per hour dissolved is more than 100%, as for example "400% per hour," it signifies that all of the composition dissolved in fifteen minutes. Hence, in such a case the 24-hour test period is in fact reduced to 15 minutes.

Table

| Item No. | Molar per cent | | | Size | Per cent dissolved per hour |
|---|---|---|---|---|---|
| | $Al_2O_3$ | $Na_2O$ | $P_2O_5$ | | |
| 30 | 10 | 30 | 60 | 10 to 20 mesh | 0.01 |
| 31 | 5 | 40 | 55 | .5 x 1 inch | 0.01 |
| 32 | 2 | 46.25 | 51.75 | 10 to 20 mesh | 1.0 |
| 33 | 1.5 | 47.25 | 51.25 | .5 x 1 inch | 1.0 |
| 34 | 1.5 | 49.25 | 49.25 | .5 x 1 inch | 1.0 |
| 35 | 3.5 | 54.0 | 42.5 | .5 x 1 inch | 1.0 |
| 36 | 6.25 | 49.25 | 44.5 | 10 to 20 mesh | 1.0 |
| 37 | 9.5 | 43.5 | 47.0 | .5 x 1 inch | 0.01 |
| 38 | 10 | 42.5 | 47.5 | 10 to 20 mesh | 0.01 |
| A | 0 | 50.0 | 50.0 | 10 to 20 mesh | 500 |
| L | 0 | 50.0 | 50.0 | .5 x 1 inch | 50 |
| B | 0 | 60.0 | 40.0 | 10 to 20 mesh | 1000 |
| D | 1 | 49.5 | 49.5 | 10 to 20 mesh | 300 |
| E | 1 | 59.4 | 39.6 | 10 to 20 mesh | 400 |
| C | 1 | 48.0 | 51.0 | 10 to 20 mesh | 57 |
| S | 1 | 48.0 | 51.0 | .5 x 1 inch | 2.3 |
| V | 3 | 48.5 | 48.5 | 10 to 20 mesh | 10 |
| M | 3 | 48.5 | 48.5 | .5 x 1 inch | 0.23 |
| P | 3 | 55.0 | 42.0 | .5 x 1 inch | 3.2 |
| F | 5 | 40.0 | 55.0 | 10 to 20 mesh | 0.042 |
| T | 5 | 40.0 | 55.0 | .5 x 1 inch | 0.01 |
| G | 5 | 47.5 | 47.5 | 10 to 20 mesh | 0.88 |
| N | 5 | 47.5 | 47.5 | .5 x 1 inch | 0.088 |
| H | 5 | 57.0 | 38.0 | 10 to 20 mesh | 25.0 |
| Q | 7 | 48.0 | 45.0 | .5 x 1 inch | 0.031 |
| I | 10 | 30.0 | 60.0 | 10 to 20 mesh | 0.01 |
| U | 10 | 30.0 | 60.0 | .5 x 1 inch | 0.002 |
| J | 10 | 45.0 | 45.0 | 10 to 20 mesh | 0.042 |
| O | 10 | 45.0 | 45.0 | .5 x 1 inch | 0.012 |
| K | 10 | 54.0 | 36.0 | 10 to 20 mesh | 6.2 |
| R | 10 | 42.5 | 47.5 | .5 x 1 inch | 0.009 |

In the diagram of the drawing, the compositions 30—32—36—38 define a shaded area of granular compositions at 10 to 20 mesh (per inch) which have described solubilities in the range from .01 to 1.0% by weight per hour. Likewise, compositions 31—33—34—35—37 define another shaded area of granular compositions at .5 x 1 inch lump size which have described solubilities in the range from .01 to 1.0% by weight per hour. These two shaded areas overlap at area 31—32—36—37, which area defines compounds having the described solubility somewhere in the range from 0.1% to 1.0% by weight per hour at any selected granulation within the range from 10 to 20 mesh (per inch) to .5 x 1 inch lump size. Accordingly, compositions on line 30—38 must be used at 10 to 20 mesh, and, as the composition moves above the line 30—38 it may be coarser and be .5 x 1 inch lump size on line 31—37. On the top end, compositions on lines 33—34—35 must be at .5 x 1 inch lump size, and as the composition moves below this boundary line 33—34—35 it may be finer and be at 10 to 20 mesh (per inch) on line 32—36.

Thus, it is seen that composition together with granulation, are controlling factors for meeting the criteria of solubility herein employed. The effect of changing granulation for a fixed composition is shown in the table in numerous pairs of items. In particular, the pair G and N, is referred to, because the described solubility is increased 10-fold by merely grinding material of .5 x 1 inch lump size to 10 to 20 mesh (per inch).

In practical operation, the above described solubility test is comparable to flowing water at 20° to 25° C. through a bed of the tested material for 24 hours at a rate of one bed-volume per minute. For convenience, to correlate operation of a bed with the test for selection of material, preferably a commercial bed is designed for flow of water therethrough at a rate of at least about one bed-volume per minute. For the less soluble compositions the rate may be higher than 1 bed-volume change per minute. Thus, a bed of the most soluble compositions of the invention will lose about 25% content per day, and can be replenished daily. Using less soluble material, it can be made to operate for a week or more without attention to refill it. By choice of the compositions of the present invention, there is no danger to the bed from congealing when there has been any cessation of the intended normal continuous flow through the bed. So designed and operated, such a bed is refillable at regular periods, preferably each week for the rate of flow as preferred above.

Example

Cooling water running continuously at a constant rate to a heat-exchanger, and having a hardness of about 17 grains per gallon, calculated as $CaCO_3$, is determined by experiment to require addition to it to prevent scale, of 1.5 to 2 parts per million of a glass composition of the present invention consisting of

$$3Al_2O_3 . 48.5Na_2O . 48.5P_2O_5$$

Such a composition in .5 x 1 inch lump size, is placed in a closed chamber having water inlet and outlet pipes, providing a bed of 1 cu. ft. volume. This composition has a solubility of .23% by weight per hour. Using a water rate of 3 bed-volumes per minute with water at 20° C., 15 parts of the composition per million of water goes into solution as the water passes through the bed. Therefore, a portion of the water to the preheater is by-passed through the bed at said rate, there being from ½ to 1/10 of the total water so by-passed in order to assure complete treatment of the water with avoidance of scale formation in the preheater. Such a bed treats 1,700,000 lbs. of water per day. The bed material originally weighs about 100 lbs. and about 20 lbs. is dissolved per week. It is serviced weekly by adding about 20 lbs. of the same granular composition, an operation taking only about 10 minutes. When the flow through the bed is stopped for any reason and water becomes static in the bed, the water merely becomes more concentrated at a low content with the composition, and the remnant glass does not congeal.

In the example, the effectiveness of the composition is indicated by the following comparison of heating the said cooling water without such treatment and with such treatment at 1.5 to 2 parts per million of the composition of the example. The untreated water heated at 80° C. for 4 hours, precipitated 20% of its hardness, while the treated water at 80° C. for 4 hours precipitated no hardness. The treatment for this test shows 100% inhibition.

From the foregoing description and explanation, it will be understood that within the shaded areas, there are possible many compositions, of which the size may be important, which may be placed into a bed for the passage of water therethrough for dissolving over conveniently long periods of time, a water-treating composition in small but effective, and controllable, amounts.

The foregoing illustrations and examples are not intended to limit the invention short of its scope as expressed in the appended claims.

I claim:

1. A water-treating composition in the form of a water-soluble glass consisting analytically of $Na_2O$, $Al_2O_3$ and $P_2O_5$, said composition being substantially that represented by the area of a trilinear diagram of compositions of $Na_2O$, $Al_2O_3$ and $P_2O_5$ which area is defined by the lines in series as follows: the metaphosphate line—the line of 10 molar per cent $Al_2O_3$—the tetraphosphate line—the line between compositions:

$$3.5Al_2O_3.54Na_2O.42.5P_2O_5$$

and $$1.5Al_2O_3.49.25Na_2O.49.25P_2O_5$$

and the line of 1.5 molar per cent of Na₂O, said compositions on the last two lines being of granulation corresponding to .5 x 1 inch lump size, and said composition on the line of 10 molar per cent Al₂O₃ being of granulation corresponding to 10 to 20 mesh (per inch), and otherwise having a granulation varying between said lump size and said mesh and such that the solubility is in the range from .01 to 1.0% by weight per hour when a quantity of the granular composition is tested for 24 hours in 5 times its weight of water at 25° C.

2. The method of adding the water-treating substance of a water-soluble vitreous glass to water which comprises forming and maintaining a porous bed of a composition according to claim 1, and passing water through said bed at a substantially constant rate while dissolving substance of said glass into the water.

3. A water-treating composition in the form of a water-soluble glass consisting analytically of Na₂O, Al₂O₃ and P₂O₅, said composition being substantially that represented by the area of a trilinear diagram of compositions of Na₂O, Al₂O₃ and P₂O₅ which area is defined by the straight lines connecting the four compositions in sequence as follows:

$$5Al_2O_3.40Na_2O.55P_2O_5$$
$$9.5Al_2O_3.43.5Na_2O.47P_2O_5$$
$$6.25Al_2O_3.49.25Na_2O.44.5P_2O_5$$
$$2Al_2O_3.46.25Na_2O.51.75P_2O_5$$

the composition having any granulation within a range of sizes extending from a fine limit of 10 to 20 mesh (per inch) to a coarse limit of .5 x 1 inch lump sizes.

4. The method of adding the water-treating substance of a water-soluble vitreous glass to water which comprises forming and maintaining a porous bed of a composition according to claim 3, and passing water through said bed at a substantially constant rate while dissolving substance of said glass into the water.

5. A water-treating composition in the form of a water-soluble glass consisting analytically of Na₂O, Al₂O₃ and P₂O₅, said composition being substantially that represented by the area of a trilinear diagram of compositions of Na₂O, Al₂O₃ and P₂O₅ which area is defined by the straight lines connecting the four compositions in sequence as follows:

$$5Al_2O_3.40Na_2O.55P_2O_5$$
$$9.5Al_2O_3.43.5Na_2O.47P_2O_5$$
$$10Al_2O_3.42.5Na_2O.47.5P_2O_5$$
$$10Al_2O_3.30Na_2O.60P_2O_5$$

the composition on the line defined by the last two of said compositions being of granulation corresponding to 10 to 20 mesh (per inch), the composition on the line defined by the first two of said compositions being of granulation ranging from a fine size of 10 to 20 mesh (per inch) to a coarse .5 x 1 inch lump size, and the composition otherwise having a granulation varying between said lump size and said mesh and such that the solubility is in the range from .01 to 1.0% by weight per hour when a quantity of the granular composition is tested for 24 hours in 5 times its weight of water at 25° C.

6. The method of adding the water-treating substance of a water-soluble vitreous glass to water which comprises forming and maintaining a porous bed of a composition according to claim 5, and passing water through said bed at a substantially constant rate while dissolving substance of said glass into the water.

7. A water-treating composition in the form of a water-soluble glass consisting analytically of Na₂O, Al₂O₃ and P₂O₅, said composition being substantially that represented by the area of a trilinear diagram of compositions of Na₂O, Al₂O₃ and P₂O₅ which area is defined by the straight lines connecting the five compositions in sequence as follows:

$$2Al_2O_3.46.25Na_2O.51.75P_2O_5$$
$$1.5Al_2O_3.47.25Na_2O.51.25P_2O_5$$
$$1.5Al_2O_3.49.25Na_2O.49.25P_2O_5$$
$$3.5Al_2O_3.54.0Na_2O.42.5P_2O_5$$
$$6.25Al_2O_3.49.25Na_2O.44.5P_2O_5$$

the composition on the lines defined by the second, third and fourth ones of said compositions being of granulation corresponding to a .5 x 1 inch lump size, the composition on the line defined by the first and last of said composition being of granulation ranging from a fine size of 10 to 20 mesh (per inch) to a coarse .5 x 1 inch lump size, and the composition otherwise having a granulation varying between said lump size and said mesh and such that the solubility is in the range from .01 to 1.0% by weight per hour when a quantity of the granular composition is tested for 24 hours in 5 times its weight of water at 25° C.

8. The method of adding the water-treating substance of a water-soluble vitreous glass to water which comprises forming and maintaining a porous bed of a composition according to claim 7, and passing water through said bed at a substantially constant rate while dissolving substance of said glass into the water.

CHARLES S. KING.